US006468806B1

(12) United States Patent
McFarland et al.

(10) Patent No.: US 6,468,806 B1
(45) Date of Patent: *Oct. 22, 2002

(54) POTENTIAL MASKING SYSTEMS AND METHODS FOR COMBINATORIAL LIBRARY SYNTHESIS

(75) Inventors: Eric McFarland, San Jose, CA (US); Earl Danielson, Palo Alto, CA (US); Martin Devenney, Mountain View, CA (US); Christopher J. Warren, Mountain View, CA (US)

(73) Assignee: Symyx Technologies, Inc., Santa Clara, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/941,170

(22) Filed: Sep. 30, 1997

Related U.S. Application Data

(60) Provisional application No. 60/027,245, filed on Oct. 2, 1996.

(51) Int. Cl.⁷ .................. G01N 33/543; G01N 27/00; C25D 21/12
(52) U.S. Cl. .................. 436/518; 205/81; 205/118; 205/123; 205/136; 422/68.1; 422/82.01; 435/DIG. 1; 435/DIG. 44; 435/DIG. 43; 435/DIG. 45
(58) Field of Search .................. 204/197, 292.1; 435/28.71, DIG. 1, DIG. 43, DIG. 44, DIG. 45; 136/518; 205/81, 118, 123, 136; 422/68.1, 82.01

(56) References Cited

U.S. PATENT DOCUMENTS

| | | | |
|---|---|---|---|
| 3,008,892 A | 11/1961 | Owen .................. 204/207 |
| 3,132,080 A | 5/1964 | Cann .................. 204/27 |
| 3,671,819 A | 6/1972 | Swanson .................. 317/234 |
| 3,835,017 A | 9/1974 | Mentone et al. .................. 204/224 |
| 3,839,175 A | 10/1974 | Keyes .................. 204/181 |
| 4,070,565 A | * 1/1978 | Borelli .................. 235/302 |
| 4,082,619 A | 4/1978 | Dehnert |
| 4,244,788 A | * 1/1981 | Faulkner .................. 204/15 |
| 4,318,608 A | * 3/1982 | Payne .................. 355/3 |
| 4,402,000 A | * 8/1983 | Fabel et al. .................. 346/155 |
| 4,539,932 A | 9/1985 | Vecellio |
| 4,689,246 A | 8/1987 | Barrett |
| 4,988,412 A | * 1/1991 | Liu et al. .................. 204/15 |
| 5,100,524 A | 3/1992 | Lester |
| 5,143,854 A | 9/1992 | Pirrung et al. |
| 5,356,756 A | 10/1994 | Cavicchi et al. |
| 5,424,186 A | 6/1995 | Fodor et al. |
| 5,450,403 A | * 9/1995 | Kubelik .................. 347/123 |
| 5,556,530 A | 9/1996 | Finkelstein et al. |
| 5,641,391 A | * 6/1997 | Hunter et al. .................. 205/80 |
| 5,653,939 A | 8/1997 | Hollis et al. .................. 422/50 |
| 5,667,667 A | * 9/1997 | Southern .................. 205/687 |
| 5,679,234 A | * 10/1997 | Immaura .................. 205/123 |
| 5,695,833 A | 12/1997 | Bok et al. |
| 5,776,359 A | 7/1998 | Schultz et al. |
| 6,182,499 B1 | 2/2001 | McFarland et al. |
| 6,187,164 B1 | 2/2001 | Warren et al. |

FOREIGN PATENT DOCUMENTS

| | | | |
|---|---|---|---|
| EP | 0 368 209 | 5/1990 | ............ C12M/1/40 |
| WO | WO 90/15070 | 12/1990 | |
| WO | WO 92/10092 | 6/1992 | |
| WO | 93/22480 | * 11/1993 | |
| WO | WO 9611878 | 4/1996 | |

OTHER PUBLICATIONS

Copending application, Ser. No. 09/694,176, filed Oct. 23, 2000.

Copending application, Ser. No. 10/106,734, filed Mar. 26, 2002.

Copending application, Ser. No. 10/106,722, filed Mar. 26, 2002.

Geysen et al., "Strategies for epitope analysis using peptide synthesis", Journal of Immunological Methods, pp. 259–274 (1987).

1996, Min–Chol Shin and Hak–Sung Kim, pp. 171–178, "Electrochemical Characterization of polypyrrole/glucose oxidase biosensor: Part II. Optimal preparation conditions for the biosensor", Biosensors & Bioelectronics, vol. 11, No. ½.

1995, Henning Sakslund, Joseph Wang, Fang Lu, Ole Hammerich, pp. 149–155, "Development and evaluation of glucose microsensors based on electrochemical codeposition of ruthenium and glucose oxidase onto carbon fiber microelectrodes", Journal of Electroanalytical Chemistry, vol. 397.

(List continued on next page.)

*Primary Examiner*—Padmashri Ponnaluri
(74) *Attorney, Agent, or Firm*—Dobrusin & Thennisch PC

(57) ABSTRACT

Methods and apparatus are provided for the preparation of a substrate having an array of diverse materials, the materials being deposited at spatially addressable, predefined regions. In particular, potential masking systems are provided which generate spatially and temporally varying electric, magnetic and chemical potentials across a substrate. These varying potentials are used to deposit components of source materials onto a substrate in a combinatorial fashion, thus creating arrays of materials that differ slightly in chemical composition, concentration, stoichiometry, and/or thickness. The diverse materials may be organized in discrete arrays, or they may vary continuously over the surface of the substrate. The shape of the potential allows the determination of the composition of the resulting materials at all locations on the substrate.

26 Claims, 7 Drawing Sheets

OTHER PUBLICATIONS

1993, K.W. Johnson et al., pp. 84–95, "Reproducible Electrodeposition Technique for Immobilizing Glucose Oxidase", *Diagnostic Biosensor Polymers*, (Arthur M. Usmani & Naim Alemal, ed.).

1991, Kirk W. Johnson, pp. 85–89, "Reproductible electrodeposition of biomolecules for the fabrication of miniature electroenzymatic biosensors", *Sensors and Actuators B*, vol. 5,

* cited by examiner

FIG. 10.

| | | 1005 | |
|---|---|---|---|
| 0.0 | -0.2 | -0.4 | -2.0 |
| 0.0 | -0.2 | -0.8 | -2.0 |
| 0.0 | -0.2 | -1.2 | -2.0 |
| 0.0 | -0.2 | -1.6 | -2.0 |

FIG. 11.

| | | | |
|---|---|---|---|
| -0.4 | -0.4 | -1.5 | -0.4 |
| -0.6 | -0.6 | -1.5 | -0.6 |
| -0.8 | -0.8 | -1.5 | -0.8 |
| -1.0 | -1.0 | -1.5 | -1.0 |

FIG. 12.

| Ni | Cu Ni | Fe Cu | Zn Ni |
|---|---|---|---|
| Ni | Ni Cu | Fe Cu Zn | Zn Ni Fe |
| Ni Fe | Cu Ni Fe | Fe Zn Cu | Zn Fe Nn |
| Fe Ni | Cu Fe Ni | Fe Zn | Zn Fe |

POTENTIAL MASKING SYSTEMS AND METHODS FOR COMBINATORIAL LIBRARY SYNTHESIS

CROSS REFERENCE TO RELATED APPLICATIONS

This application claims the benefit of U.S. Provisional Application No. 60/027,245, filed Oct. 2, 1996, the complete disclosure of which is incorporated herein by reference for all purposes. This application is also related to commonly assigned, co-pending U.S. patent application Ser. No. 08/841,423, entitled "THE COMBINATORIAL SYNTHESIS OF NOVEL MATERIALS", filed Apr. 22, 1997, the complete disclosure of which is incorporated herein by reference for all purposes.

FIELD OF THE INVENTION

The present invention generally relates to methods and apparatus for the parallel deposition, synthesis and screening of an array of diverse materials at known locations on a single substrate surface. More specifically, the invention is directed to potential masking systems and methods for applying a spatially varying potential across a substrate to deliver different materials to spatially addressable locations on the substrate.

BACKGROUND OF THE INVENTION

The discovery of new materials with novel chemical and physical properties often leads to the development of new and useful technologies. Currently, there is a tremendous amount of activity in the discovery and optimization of materials, such as superconductors, zeolites, magnetic materials, phosphors, nonlinear optical materials, thermoelectric materials, high and low dielectric materials and the like. Unfortunately, even though the chemistry of extended solids has been extensively explored, few general principles have emerged that allow one to predict with certainty the composition, structure, and reaction pathways for the synthesis of such solid state compounds.

The preparation of new materials with novel chemical and physical properties is at best happenstance with our current level of understanding. Consequently, the discovery of new materials depends largely on the ability to synthesize and analyze new compounds. Given approximately 100 elements in the periodic table that can be used to make compositions consisting of three, four, five, six or more elements, an incredibly large number of possible new compounds remains largely unexplored. As such, there exists a need in the art for a more efficient, economical and systematic approach for the synthesis of novel materials and for the screening of such materials for useful properties.

One of the processes whereby nature produces molecules having novel functions involves the generation of large collections (libraries) of molecules and the systematic screening of those collections for molecules having a desired property. An example of such a process is the humoral immune system which in a matter of weeks sorts through some $10^{12}$ antibody molecules to find one which specifically binds a foreign pathogen (Nisonoff et al., *The Antibody Molecule* (Academic Press, New York, 1975)). This notion of generating and screening large libraries of molecules has recently been applied to the drug discovery process.

Using this logic, methods have been developed for the synthesis and screening of large libraries of up to $10^{14}$ molecules of peptides, oligonucleotides and other small molecules. Geysen et al., for example, have developed a method wherein peptide syntheses are carried out in parallel on several rods or pins (*J. Immun. Meth.* 102:259–274 (1987), incorporated herein by reference for all purposes). Generally, the Geysen et al. method involves functionalizing the termini of polymeric rods and sequentially immersing the termini in solutions of individual amino acids. In addition to the Geysen et al. method, techniques have recently been introduced for synthesizing large arrays of different peptides and other polymers on solid surfaces. Pirrung et al. have developed a technique for generating arrays of peptides and other molecules using, for example, light-directed, spatially-addressable synthesis techniques (U.S. Pat. No. 5,143,854 and PCT Publication No. WO 90/15070, incorporated herein by reference for all purposes). In addition, Fodor et al. have developed, among other things, a method of gathering fluorescence intensity data, various photosensitive protecting groups, masking techniques, and automated techniques for performing light-directed, spatially-addressable synthesis techniques (Fodor et al., PCT Publication No. WO 92/10092, the teachings of which are incorporated herein by reference for all purposes).

Using these various methods, arrays containing thousands or millions of different elements can be formed (U.S. patent application Ser. No. 08/805,727, filed Dec. 6, 1991, the complete disclosure of which is incorporated herein by reference for all purposes). As a result of their relationship to semiconductor fabrication techniques, these methods have come to be referred to as "Very Large Scale Immobilized Polymer Synthesis," or "VLSIPS™" technology. Such techniques have met with substantial success in screening various ligands such as peptides and oligonucleotides to determine their relative binding affinity to a receptor such as an antibody.

The solid phase synthesis techniques currently being used to prepare such libraries involve the sequential coupling of building blocks to form the compounds of interest. For example, in the Pirrung et al. method polypeptide arrays are synthesized on a substrate by attaching photo-removable groups to the surface of the substrate, exposing selected regions of the substrate to light to activate those regions, attaching an amino acid monomer with a photo-removable group to the activated region, and repeating the steps of activation and attachment until polypeptides of the desired length and sequence are synthesized. These solid phase synthesis techniques cannot readily be used to prepare many inorganic and organic compounds.

In PCT WO 96/11878, the complete disclosure of which is incorporated herein by reference, methods and apparatus are disclosed for preparing a substrate with an array of diverse materials deposited in predefined regions. Some of the methods of deposition disclosed in PCT WO 96/11878 include sputtering, ablation, evaporation, and liquid dispensing systems. Using the disclosed methodology, many classes of materials can be generated combinatorially including inorganics, intermetallics, metal alloys, and ceramics.

In order to provide an efficient approach to synthesizing and screening new materials, a method of forming arrays of materials with varying chemical composition, concentration, stoichiometry and thickness at known locations on a substrate is desirable.

SUMMARY OF THE INVENTION

The present invention provides methods and apparatus for depositing various components onto a substrate to form an array of diverse materials, the materials being deposited in predefined regions. In particular, the present invention provides potential masking methods and systems which generate spatially varying electric, magnetic and/or chemical potentials across a substrate. These spatially varying potentials are used to deposit patterned combinatorial libraries in which the individual materials vary in chemical composition, concentration, stoichiometry, and/or thickness.

Once an array is prepared, a variety of characterization techniques may be used to rapidly screen and/or characterize the large number of materials contained on the array. A few of the material properties which may be easily investigated using this system include conductivity, super-conductivity, resistivity, thermal conductivity, anisotropy, hardness, crystallinity, optical transparency, magnetoresistance, permeability, frequency doubling, photoemission, coercivity, and dielectric strength. As a result of this rapid screening process, new compositions with new physical properties can be quickly identified. Once identified, a variety of well known methods can be used to prepare the materials on a larger scale.

Systems of the present invention comprise one or more source materials and a potential assembly for applying a spatially varying potential across a substrate, thus enabling components of the source materials to be deposited at spatially addressable locations on the substrate. The components may be deposited either in discrete arrays or in continuously varying patterns. Although the present invention potentially has the ability to create any number of different materials on a single array, typically an array will contain more than 9 different materials. Typically the array will contain at least 50 different materials, although for specific applications the array may contain more than 100 different materials, more than $10^3$ different materials, more than $10^4$ materials, more than $10^5$ different materials, or more than $10^6$ different materials.

In some embodiments of the invention, the system will comprise an array of discrete potential generating devices (e.g., electrodes, magnets) positioned adjacent to or embedded within the substrate. Each discrete potential generating device defines a library region or element on the substrate. By varying the potential at each device site, a slightly different component will be deposited onto the corresponding library region. In other embodiments of the invention, the spatially varying potential is created by a continuously varying potential element, such as a resistive electrode or a diffusive transport matrix. In these embodiments, the potential element will cause components of the source material(s) to deposit in a continuously varying pattern onto the substrate.

In one embodiment of the invention, the potential assembly applies a spatially varying electric potential across a substrate to selectively deposit components of the source material onto spatially addressable locations. In this embodiment, the substrate is brought into contact with an ionic solution or vapor stream and the voltage and/or current density is varied across the substrate to produce a spatially varying electric potential. The source material is introduced into the ionic solution or vapor stream such that components of the source material electrochemically deposits onto the substrate in accordance with the spatially varying potential. Generally, deposition and oxidation or reduction of the charged species from the ionic solution or vapor stream occurs onto those library elements with sufficient electrical potential to overcome the requisite oxidation or reduction potential.

The spatially varying electric potential may be applied to the substrate by an array of spatially addressable working electrodes coupled to or embedded within the substrate. Other methods of applying the spatially varying electric potential include a gradient-swept continuous electrode and/or an electrostatic micropattern. In one embodiment utilizing working electrodes, the array may also include one or more reference electrodes, the reference electrodes being suitably positioned to provide the requisite potentials at the library regions (galvanostatic). In a second embodiment, each working electrode has a reference electrode and a counter electrode (potentiostatic). In other embodiments, the composition of the ionic solution or vapor stream is varied while varying the relative voltages or currents applied to the individual library regions.

In another embodiment of the invention, the potential assembly applies a spatially varying magnetic potential across the substrate to selectively deposit components of the source material onto spatially addressable locations. In this embodiment magnetic field gradients can be produced by locating individually addressable electromagnets adjacent to the individual library regions. Alternatively, the potential assembly may comprise one or more magnetic films with domain maps created to produce pre-determined magnetic field gradients across the substrate. Source materials, such as dry powders, suspensions, or molecules, are delivered adjacent to the substrate and are attracted to the substrate in proportion to the spatially varying field strength and the magnetic moment of the individual components. The source materials in this embodiment may include any material with a sufficiently large magnetic moment (e.g., Fe, Co, Ni) or any material attached to such a magnetic carrier.

In yet another embodiment of the invention, the potential mask assembly applies a spatially varying chemical potential across the substrate to selectively deposit components of the source material onto spatially addressable locations on the substrate. In this embodiment, chemical potential gradients drive diffusion when the concentration of species varies in space. In a specific embodiment, the delivery system comprises an isotropic point molecular source positioned relative to the substrate such that the flux of molecules deposited on the substrate varies as the inverse square of the distance to the substrate. Thus, the spatial locations nearest the source receive the largest deposition rate and the spatial locations farthest away from the source receive the lowest deposition rate. Suitable techniques of generating a molecular source include laser deposition, electron beam evaporation, radiofrequency sputtering in a vacuum, aerosolized spray, evaporation in a fill gas, or a dispensed liquid point source. The transport matrix between the source and the substrate may comprise a vacuum space, liquid solvent, polyelectrolyte, neutral porous solid, or an intentionally heterogeneous material that creates a diffusion gradient. Finally, the electrochemical arrays of the present invention may also be used as a screening technique. In this embodiment the individual electrodes comprising the arrays can be used to make electrochemical measurements and/or magnetic measurements of the materials located at the predefined regions (e.g., cyclic photometry, over-potential measurement, open circuit potential measurements, as well as other electrochemical measurements well known in the field).

A further understanding of the nature and advantages of the present invention may be realized by reference to the remaining portions of the specification and the attached drawings.

BRIEF DESCRIPTION OF THE DRAWINGS

FIG. 10 indicates the electrical potential at each electrode of a 4×4 array used during the first step of preparing 16 different materials according to the method of the present invention;

FIG. 11 indicates the electrical potential. at each electrode of the 4×4 array of FIG. 10 during the second step of preparing 16 different materials;

FIG. 12 indicates the 16 different compositions obtained during the method illustrated in FIGS. 10 and 11;

DETAILED DESCRIPTION OF THE INVENTION AND PREFERRED EMBODIMENTS

Glossary

Figure 1:
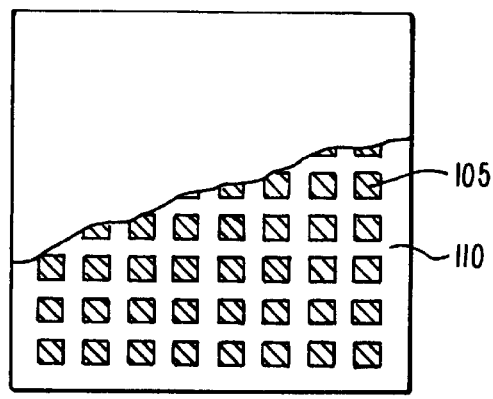
FIG. 1 illustrates a discrete array of spatially addressable electrodes coupled to or embedded within a substrate.

The following terms are intended to have the following general meanings as used herein.

Substrate: A substrate is a material having a rigid or semi-rigid surface. In many embodiments at least one surface of the substrate will be substantially flat. In some embodiments the substrate will contain physical separations between synthesis regions for different materials. Suitable physical separations include, for example, dimples, wells, raised regions, and etched trenches. According to other embodiments, small beads or pellets may be provided on the surface, either alone or within substrate surface dimples. The surface area of the substrate is designed to meet the requirements of a particular application. Typically, the surface area of the substrate is in the range of 1 $cm^2$ to 400 $cm^2$. However, other sizes may be used with the present invention, for example surface areas as small as 0.001 $cm^2$ or as large as 10 $m^2$ are possible.

Predefined Region: A predefined region is a localized area on a substrate which is, was, or is intended to be used for the formation of a specific material. The predefined region may be referred to, in the alternative, as a "known" region, a "reaction" region, a "selected" region, or simply a "region."

The predefined region may have any convenient shape, e.g., linear, circular, rectangular, elliptical, or wedge-shaped. Additionally, the predefined region can be a bead or pellet which is coated with the component(s) of interest. In this embodiment, the bead or pellet can be identified with a tag, such as an etched binary bar code, that can be used to identify which components were deposited on the bead or pellet. The area of the predefined regions depends on the application and is typically smaller than about 25 $cm^2$. However, the predefined regions may be smaller than 10 $cm^2$, smaller than 5 $cm^2$, smaller than 1 $cm^2$, smaller than 1 $mm^2$, smaller than 0.5 $mm^2$, smaller than 10,000 $\mu m^2$, smaller than 1,000 $\mu m^2$, smaller than 100 $\mu m^2$, or even smaller than 10 $\mu m^2$.

Radiation: Radiation refers to energy with a wavelength between $10^{-14}$ and $10^4$. Examples of such radiation include electron beam radiation, gamma radiation, x-ray radiation, ultraviolet radiation, visible light, infrared radiation, microwave radiation, and radio waves. Irradiation refers to the application of radiation to a surface.

Component: Component is used herein to refer to each of the individual chemical substances that are deposited onto a substrate. Components can act upon one another to produce a particular material. Components can react directly with each other or with an external energy source such as radiation, an electric field, or a magnetic field. Components can also be acted upon by a third material or a chemical substance. A component can be an element, a chemical, a material, or a mixture of elements and chemicals. Components can form layers, blends or mixtures, or combinations thereof.

Source Material: The term source material is used herein to refer to the original material from which a component was derived. Source materials can be composed of elements, compounds, chemicals, molecules, etc. that are dissolved in a solvent, vaporized, evaporated, boiled, sublimed, ablated, etc., thus allowing the source materials . to deposit onto a substrate during the synthesis process.

Resulting Material: The term resulting material is used herein to refer to the component or combination of components that have been deposited onto a predefined region of a substrate. The resulting materials may comprise a single component, or a combination of components that have reacted directly with each other or with an external source. Alternatively, the resulting material may comprise a layer, blend or mixture of components on a predefined region of the substrate. The resulting materials are screened for specific properties or characteristics to determine their relative.

Mixture or Blend: The term mixture or, interchangeably, blend refers to a collection of molecules, ions, electrons, or chemical substances. Each component in the mixture can be independently varied. A mixture can consist of two or more substances intermingled with no constant percentage composition, wherein each component may or may not retain its essential original properties, and where molecular phase mixing may or may not occur. In mixtures, the components making up the mixture may or may not remain distinguishable from each other by virtue of their chemical structure.

Layer: The term layer is used herein to refer to a material that separates one material, component, substrate or environment from another. A layer is often thin in relation to its area and covers the material beneath it. A layer may or may not be thin or flat, but once it is deposited it generally covers the entire surface such that it separates the component or substrate below the layer from the component or environment above the layer.

Electrochemical Potential Arrays

In a first aspect of the invention, components of materials are deposited onto a substrate by varying the electric potential across the substrate. In one embodiment, the electric potential is varied in time and/or space by varying the voltage or current density on each of a plurality of electrodes relative to one or more common reference electrode(s). The array of electrodes form a library of spatially addressable locations or library elements on the substrate. Deposition and oxidation or reduction of the charged species from the fluid (or vapor stream) occurs onto those library elements with sufficient electrical potential to overcome the requisite oxidation or reduction potential (and associated overpotentials). By changing the compositions of the ionic solutions (or vapor stream) and varying the relative voltages, regions of varying thickness and composition can be achieved over the entire library.

In an embodiment illustrated in FIG. 1, a discrete array of spatially addressable electrodes 105 are coupled to or embedded within a substrate 110, each electrode 105 occupying a known location on the substrate. The electric potential of each electrode 105 is controlled individually or collectively in amplitude and time to generate a predefined spatial-temporal electric potential gradient across substrate 10. The array in this embodiment may also include one or more reference electrodes (not shown).

In an embodiment utilizing multiple reference electrodes (not shown), each of the reference electrodes is located adjacent to each of the spatially addressable working electrodes. If a single reference electrode is employed, the reference electrode may be continuous and constant or, alternatively, continuous and varying. If a plurality of reference electrodes are employed, the electrodes are preferably discrete and varying. The plurality of spatially addressable electrodes and their individual electrical connections are patterned on or, alternatively, embedded within the surface of the substrate.

The working electrodes and the reference electrodes are independently coupled to one or more power supplies (not shown) for applying voltages independently to each electrode. The system may comprise a single, multi-channel power supply, or a plurality of power supplies for applying different potentials to each of the electrodes. Alternatively, the electrodes may be coupled to a single power supply. In this embodiment current or power limiting elements, such as inductors, inductor-capacitor circuits, or resistors, are placed in series with each of the electrodes in order individually control the applied potential.

Figure 2:
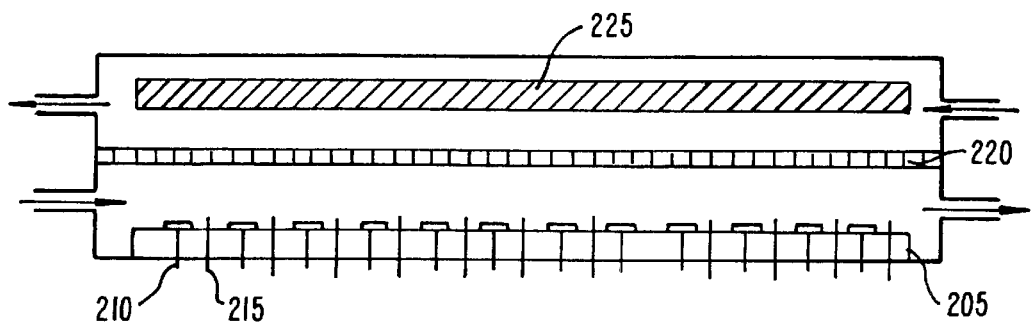
FIG. 2 illustrates an alternative embodiment that employs potentiostatic control to apply a spatially varying electrical potential across a substrate.

FIG. 2 illustrates an alternative embodiment that employs potentiostatic control to apply a spatially varying electrical potential across a substrate 205. In a representative embodiment, substrate 205 includes an array of working electrodes 210 and an array of reference electrodes 215 positioned below a permeable membrane 220 and a counter electrode 225. A solution (or gas) of ionic molecular precursors fills the chamber surrounding the electrodes. The solution (or gas) may be varied for each deposition step.

Figure 3:
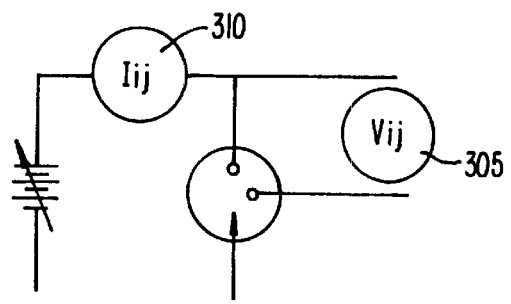
FIG. 3 is an overview of the electric circuit for the potentiostatic control system illustrated in FIG. 2.

FIG. 3 is an overview of the electric circuit for the potentiostatic control system. As illustrated, a varying voltage 305 and a varying current 310 are applied to each pair of working and reference electrodes 210, 215 and counter electrode 225. The individual voltages and currents for each element are independently controlled such that electrochemical deposition of material from the solution (or gas) is varied at each region in the array.

In this embodiment, substrate 205 can be porous or non-porous and is comprised of one or more electrically insulating materials, such as polymers, plastics, pyrex, quartz, resins, silicon, silica, silica-based materials, carbon, inorganic glasses, inorganic crystals, and membranes. Other suitable substrate materials will be readily apparent to those of skill in the art. In an exemplary embodiment, the substrate comprises silicon dioxide. The most appropriate substrate will depend on the electrodes employed and the class of materials to be synthesized. The spatially addressable electrodes are preferably formed of a metal such as platinum, copper, aluminum, silver, or gold although a variety of other materials such as carbon or doped semiconductor may also be used.

In another embodiment, the electrolyte fluids are isolated around each electrode/counter electrode unit, thus creating an array of wells.

In another embodiment of the invention, continuous variations in the electric field are created using resistive substrates and electric field gradient deposition to deposit powders over selected library elements. In this process, powder accumulates in proportion to the electric field created by gradients in the charge distribution on the resistive substrate. Different charge distribution patterns can be created for each charged material source material. Through repeated deposition steps, a variety of materials may be serially deposited.

Figure 4:
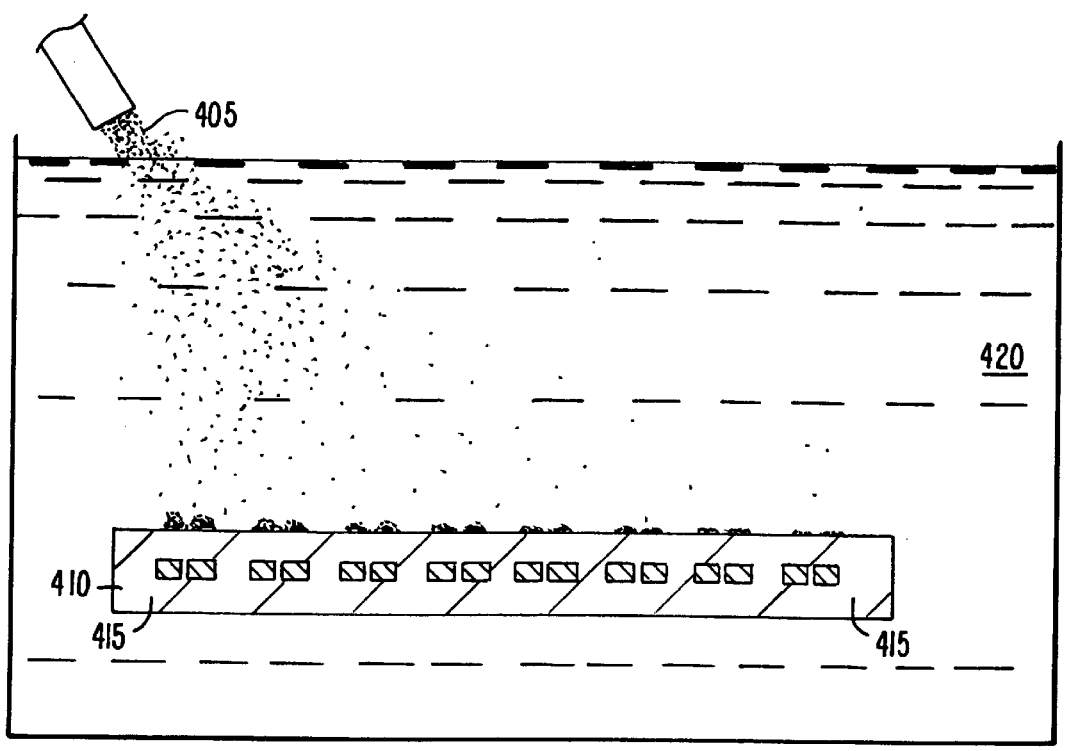
FIG. 4 illustrates an embodiment in which the source materials are deposited on a substrate having an array of spatially addressable electrodes.

FIG. 4 illustrates the above embodiment in which one or more source materials 405 are deposited on a substrate 410 having an array of spatially addressable electrodes 415. In this technique, electrode array 415 and substrate 410 are first submersed in a fluid bath 420 comprising a solution of ionic species. Source materials 405 are then introduced into the bath 420 and an electric potential is applied to one of the electrodes within array 415 such that a first component of the source material is deposited onto that electrode. A second electric potential is applied to a second spatially addressable electrode within array 415 and a second component of the source material is deposited onto that electrode. Those of skill in the art will readily appreciate that these steps are repeated multiple times until a diverse set of known components/materials are formed on the substrate at known locations. It should be understood that the different electrode potentials can be applied sequentially as described above, or simultaneously such that the various components are deposited substantially simultaneously onto array 415.

Figure 5:
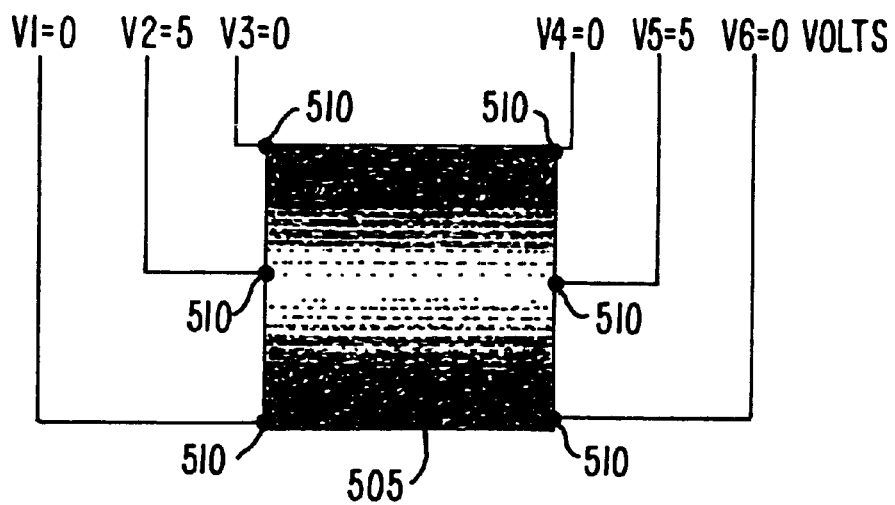
FIG. 5 illustrates an embodiment utilizing a resistive electrode to achieve a continuously varying electric potential over the surface of the electrode.
Figure 6:
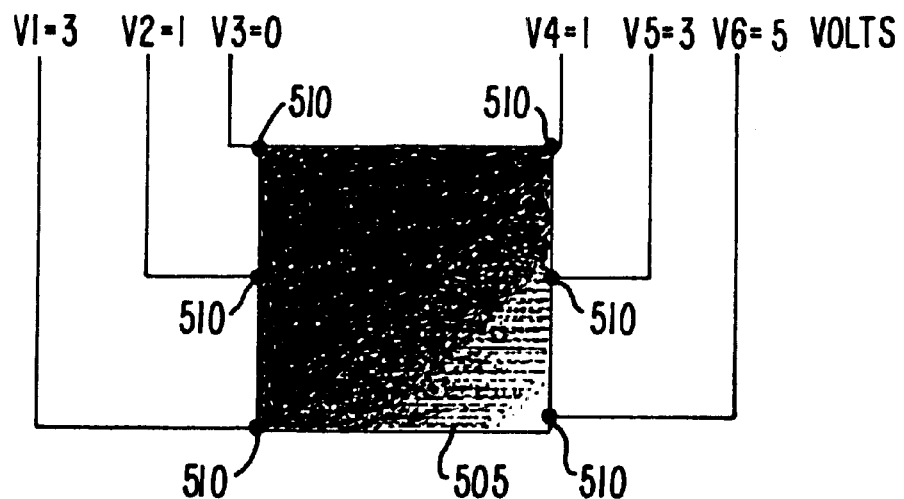
FIG. 6 illustrates the resistive electrode configuration shown in FIG. 5 in which the electric potential at the electrical contacts has been changed to achieve a different deposition pattern.

Another embodiment of the invention is illustrated in FIG. 5. In this embodiment a resistive electrode 505 is used in order to obtain a continuous spatial variation in the electric potential over the surface of the electrode. Resistive electrode 505 is formed of graphite, doped semiconductor, or other resistive material and is either coupled to or integral with the substrate. In addition, electrode 505 may actually be the substrate. Resistive electrode 505 may or may not have individual discrete elements of conducting material deposited thereon, the discrete elements being tailored to specific chemical compounds. As with the previously described embodiment, a reference electrode may be utilized which is continuous and constant or, alternatively, continuous and varying. As illustrated in FIGS. 5 and 6, the electric potential field distribution varies substantially continuously in accordance with the current distribution determined by the location of a plurality of electrical contacts 510 and their voltages. In this case, electrode 505 provides a different electric potential at each point within the electrode due to the voltage drop across the material's resistance. Thus different deposition patterns, as illustrated in the examples of FIGS. 5 and 6, may be obtained. As in the prior embodiments, repeating the deposition step with a variety of source materials allows a diverse set of components/materials to be formed on a single substrate.

Magnetic Potential Arrays

In another aspect of the invention, magnetic potentials can be used alone or in combination with electrochemical masking for the preparation and deposition of a more limited, but very important, class of materials. Many magnetic transition metals (e.g., Fe, Co, Ni), or molecules, clusters, or other structures that contain a transition metal, have sufficiently large magnetic moments to be deposited using magnetic field gradients. Magnetic field arrays can be created by controllable electromagnet library elements or on magnetic thin-film substrates, whereby the magnetic gradients are created in specific spatial patterns by selectively changing the film magnetization in much the same manner as information is written to hard disk drives. Dry powders, suspensions, or molecules possessing net magnetic moments will be attracted within the magnetic field gradient and accumulate onto the substrate in proportion to the field strength at each library element.

Figure 7:
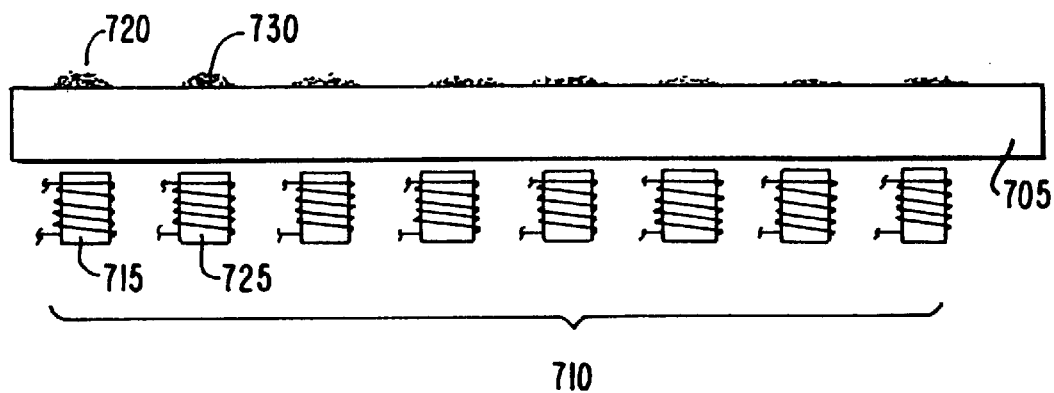
FIG. 7 illustrates another embodiment of the present invention comprising a library synthesis apparatus incorporating an array of spatially addressable electromagnets.

In an embodiment illustrated in FIG. 7, a spatially varying magnetic potential is generated over a substrate 705 by an array of spatially addressable magnets 710, preferably electromagnets. Magnets 710 may or may not be attached to or part of substrate 705. Each magnet 710 is present at a known location and can be controlled independently of the other magnets in order to create a spatially varying magnetic field gradient. The magnetic field gradient provides the necessary force on the source materials having a magnetic moment, thus depositing them on the substrate in a preprogrammed manner. Substrate 705 may be formed from a variety of materials including, for example, metals, polymers, silicon, silica, silica-based materials and ceramics. The most appropriate substrate depends on the material to be created at the reaction site, the method of reaction, and the class of materials to be synthesized.

In use with the present invention, one or more source materials are provided adjacent to substrate 705 and array 710. The materials may be suspended in a fluid over the substrate, or delivered onto the substrate as dry particles. A first magnetic field is applied to a first magnet 715 of array 710, causing a first component 720 of the source material to be deposited. A second magnetic field having a different potential than the first magnetic field is then applied to a second magnet 725 causing a second component 730 of the source material to be deposited. Those of skill in the art will readily appreciate that these steps are repeated multiple times with multiple different components until a diverse set of known components/materials are formed on the substrate at known locations. Also, it should be understood that the magnetic fields can be applied sequentially or simultaneously.

In a further embodiment, the present invention provides a method for fixing the resulting materials onto the substrate at the deposition site defined by the controllable electromagnet. This fixation process may include, but is not limited to, heating the site or substrate and then illuminating the site or substrate with electrons or photons to initiate reaction. In addition, the site of deposition may be a conducting electrode. In this embodiment, a voltage applied to the electrode can be used to initiate an electrochemical reaction of the deposited materials, a hybridization of the electrochemical embodiment with the magnetic embodiment.

Chemical Potential Arrays

In another aspect of the invention, chemical potential gradients may be used alone or in combination with the magnetic and electrochemical potentials described above to deposit various materials onto a substrate. In this embodiment, chemical potential gradients drive diffusion when the concentration of species varies in space. This process is advantageously used in the present invention to achieve spatially varying libraries of chemical compounds.

In one embodiment, an isotropic point molecular source is positioned relative to the library substrate such that the flux of molecules deposited on the substrate varies as the inverse square of the distance to the substrate. Therefore those spatial locations nearest the source receive the highest deposition rate and those locations furthest from the source receive the lowest deposition rate. Controlled motion of multiple sources allows large variations in deposition to be easily achieved. The molecular source and medium may comprise laser sputtering, electron beam evaporation, or RF sputtering in a vacuum, aerosolized spray or evaporation in a fill gas, or a dispensed point source in an unstirred liquid medium.

The components of the source materials are delivered from the source through a transport matrix and onto the substrate under the influence of a chemical potential gradient. The transport matrix can be, for example, a uniform vacuum space, liquid solvent, polyelectrolyte, neutral porous solid or an intentionally heterogeneous material (e.g., designed diffusion gradients). The matrix itself can provide a diffusion mask for source molecules such that deposition in specific library regions can be controlled by the diffusivity of the surrounding matrix. Mobility differences can be used in a multidimensional mode to first segregate molecules on the basis of their rate of movement under the influence of an electric or magnetic field and then, secondarily, an electrical potential can be made to attract the initially separated species to specific library elements.

Figure 8:
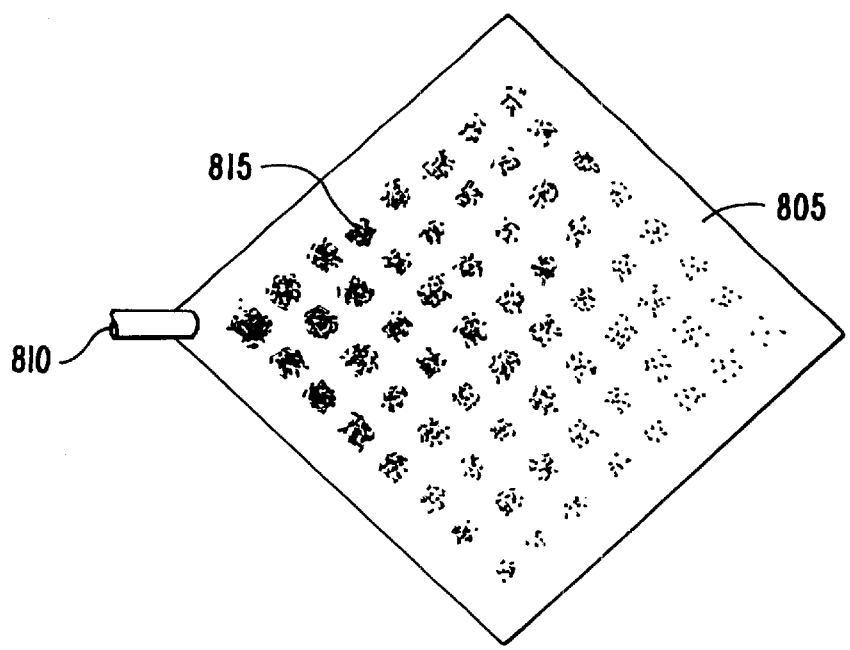
FIG. 8 illustrates a method of depositing components onto a substrate with a varying chemical potential according to another embodiment of the present invention.
Figure 9:
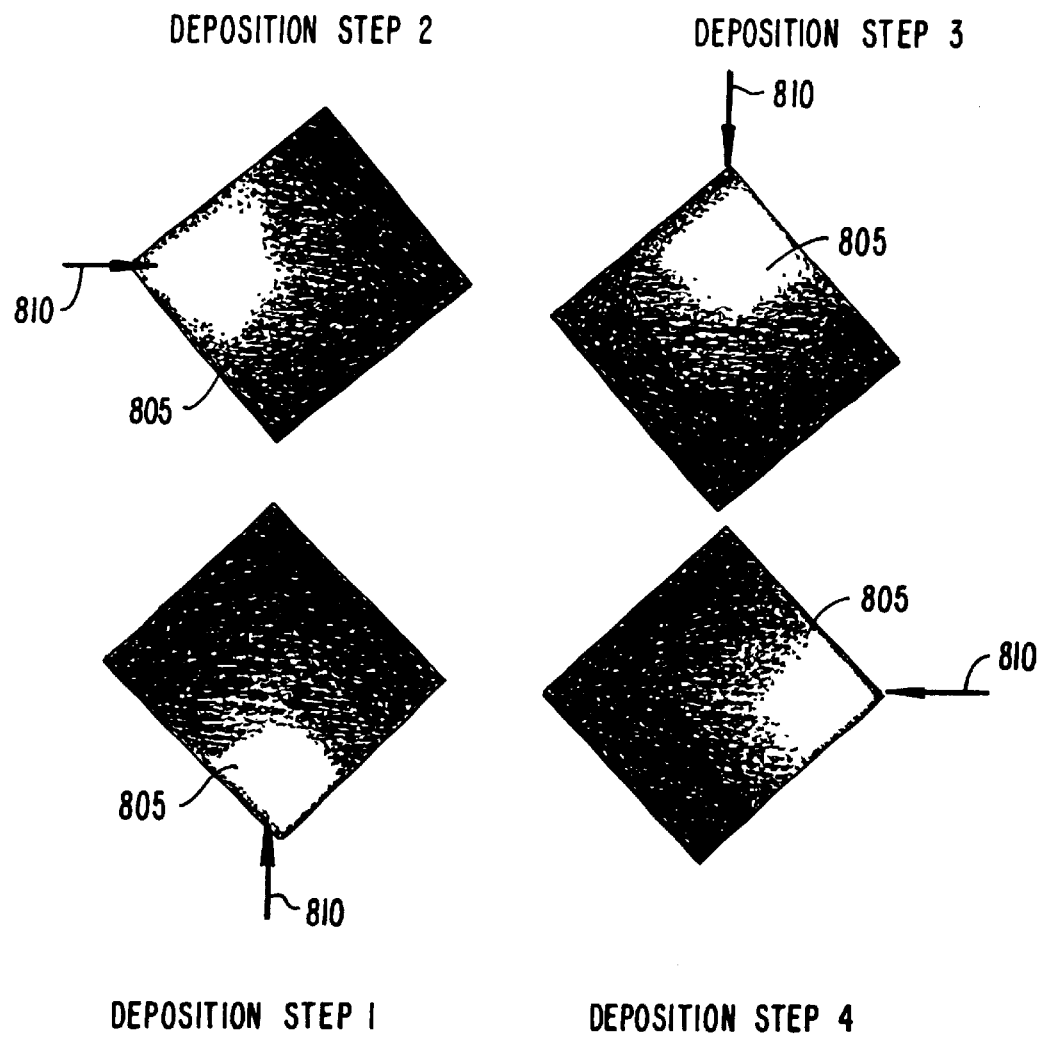
FIG. 9 illustrates the effects of moving the vapor source shown in FIG. 8.

FIGS. 8 and 9 illustrate a spatially varying chemical gradient according to the present invention. The concentration gradient is generated by the relative geometric placement of the source material in relation to the substrate. In this embodiment the system comprises an inert substrate 805 (e.g., silicon) and a vapor source 810 (e.g., a nozzle). Due to the location of vapor source 810 relative to substrate 805, different rates of deposition are received at different spatial locations. FIG. 9 illustrates the technique of moving source 810 between consecutive deposition steps, thus achieving a spatially varying pattern of combinations of many different materials.

In another embodiment, the system comprises a polymer gel polyelectrolyte wherein the substrate is a conducting metal electrode. Ionic salts introduced at a finite source into the polyelectrolyte diffuse and establish a diffusion gradient whereby the concentration varies in a predetermined manner within the gel. The substrate within the gel is in contact with the materials at different concentrations, the concentrations being determined by the distance from the source as well as the time from the introduction of the source. The diffusing materials may be fixed to the substrate and another, different, material introduced into the gel, either at the same position or at a different position. A new gel may also be used.

In another embodiment, a method for fixing the materials at a deposition site 815 includes heating the site or substrate and illuminating the site or substrate with electrons or photons to initiate reaction. In addition, the deposition site may be a conducting electrode and a voltage applied to the electrode can be used to initiate an electrochemical reaction of the deposited materials, a hybridization of the electrochemical embodiment with the chemical potential embodiment.

Lastly, the potential masking methods of combinatorial library design and deposition described above can be easily combined with other physical masking methods whereby libraries can be partially created using one method and then transferred to a different system for further deposition.

The invention will be described in greater detail by way of specific examples. The following examples are offered for illustrative purposes, and are not intended to limit the invention in any manner. Those of skill in the art will readily recognize a variety of non-critical parameters that can be changed or modified to yield essentially the same results.

EXAMPLES

Example 1

This example illustrates the use of an array of spatially addressable electrodes to prepare an array of 16 different resulting materials. In this example, an array of 16 platinum electrodes were fabricated on a silicon dioxide substrate and placed in a bath together with a saturated calomel reference electrode. A solution of 30 g/L boric acid, 0.005 M $CuSO_4$, and 0.5 M $ZnSO_4$ (i.e., the source material) was introduced into the chamber. Electrodes 1005 within the array and their electrical potentials are shown in FIG. 10.

Sufficient current was passed through the array to deposit approximately 100 nanometers in column four. No deposition occurred in column one. In column two, only copper was deposited whereas both copper and zinc were deposited in the lower two rows of column three. Predominately zinc was deposited in row four even though the potential was such that both copper and zinc were favored. It is the higher concentration of zinc that favors its deposition. Pure copper and pure zinc depositions can be achieved by using one ionic solution followed by the other.

Thereafter, the chamber was rinsed and a second solution was introduced.

This time the solution contained 30 g/L boric acid, 0.005 M $NiCl_2$, and 0.5 M $FeSO_4$. The electrode potentials were set as shown in FIG. 11. Only nickel was deposited in rows one and two of columns one, two, and four. Both nickel and iron were deposited in rows three and four of columns one, two, and four. Predominantly iron plated out in column three.

After approximately 100 nanometers was deposited in column three, the library was again rinsed. After only two bath changes, 16 different compositions were obtained. An approximate ordering (most abundant to least) is illustrated in FIG. 11. In column one, the first two rows differ in their thickness and trace iron content.

It should be noted that each electrode can be charged for different lengths of time in order to achieve nearly uniform thickness for differing compositions. Moreover, more complicated ionic solutions and potential configurations are possible resulting in a large variety of compositions. In this example, mixed solutions were shown to indicate how co-deposition of two (or more) metal cations can be achieved using solutions with mixtures of cations of differing reduction potentials. Single element deposition steps are easily accomplished using serial solutions containing single species.

Those of skill in the art will readily appreciate that processing can also be done, if necessary, between depositions, in situ, by removing the solution of bulk carrier vapor and heating the developing substrate and/or passing oxidizing or reducing gases over the substrate to complete more complicated syntheses. Other ionic constituents can subsequently be reloaded into the deposition chamber and the process continued.

Example 2

This example illustrates the preparation of a library of II–VI based phosphors using the potential masking strategies of the present invention. Doped alkaline earth sulphides have shown promise as efficient flat panel display phosphors. Simple volatile compounds of the alkaline and rare earth precursors are difficult to obtain. As a result, conventional thin-film deposition techniques have made little progress in this area. Simple, non-volatile ionic salts are easily obtained, however, and form the basis for a combinatorial synthesis of a family of phosphors. Again, by the systematic variation of the electrode potentials and current densities and the sequential replacement of the solutions with an accompanying flow of $H_2S$, a combinatorial library of alkaline earth sulfides can be formed.

Numerous possibilities exist for significant phosphor development within the II–VI family. Similar combinatorial strategies can be employed in the production of a wide range of materials including, but not limited to, the following:

i) ZnS:dopant wherein the dopant is selected from the group consisting of Ag, Mg, Mn, Ni, Al, and rare earths;

ii) ZnSe:dopant wherein the dopant is selected from the group consisting of Ag, Mg, Mn, Ni, Al, and rare earths;

iii) $Cd_{1-x}Zn_xS$:dopant wherein the dopant is selected from the group consisting of Ag, Mg, Mn, Ni, Al, and rare earths; and iv) ZnO:dopant wherein the dopant is selected from the group consisting of Ag, Mg, Mn, Ni, Al, and rare earths.

All of the foregoing combinations are amenable to electrochemical synthesis and doping.

Example 3

This example illustrates the synthesis of heterogeneous catalysts using combinatorial alloy electro-deposition techniques. The use of transition metals and binary transition metal alloys as industrial catalysts is well known. Little, however, is known about the possible role of ternary and higher order metal-based alloys as catalytic materials. One example of an application of potential masking is in the programmed deposition of multiple metals on an electrode array with electrically isolated and individually controllable electrodes (continuous electrode gradients could also be used). The combinatorial library is then created using either:

i) Sequential, combinatorial mixtures of transition metal salts resulting in a number of different stoichiometries deposited at the electrode(s); or ii) Combinatorial I/V sequencing of the electrode arrays resulting in a variety of different multi-alloys deposited at the electrode(s), e.g., $Pt_xRh_yIr_z@V_1,j_1$, $Pt_{x'}Rh_{y'}Ir_{z'}@V_2,j_2$, etc. During the process of simultaneous metal electro-deposition, the ratios of the current densities with which the various metals are deposited are functions of the metals' exchange-current densities, transfer coefficients, and differences among their equilibrium potentials. The larger the value of a metal's exchange-current density and the more positive its equilibrium potential, the greater will be its rate of deposition. Even in the case where a particular metal's deposition is not favored by its equilibrium potential (more negative) or exchange current (lower), the metal's rate of deposition can be increased if its transfer coefficient is greater than the others. In most alloy electro-depositions, the predominance for deposition of one metal ion over another is a strongly potential-dependent process due to the different Tafel slopes of the individual species. By careful control and alteration of both the supporting electrolyte and the electrode materials, the potential masking strategies disclosed herein are capable of producing a large number of higher order alloy systems.

Another manner by which a metal with a less positive equilibrium potential can be selectively deposited to a greater extent is by limiting the mass transport of the more positive metal species in the electrolyte. Such transport masking of the metal salts provides another means with which the electro-deposited alloys can be combinatorialized.

Example 4

This example illustrates the use of the potential masking of the present invention and electro-polymerization to prepare combinatorial libraries of optically useful polymers. Most optically and electronically useful polymers are based upon conjugated polymer structures. However, such polymer systems suffer from poor stability resulting from a number of destructive, photo-redox processes. Additional complications arise due to the limited solubilities and, therefore, processability of these conjugated polymer systems. Extensive synthetic exploration is required to stabilize and solubilize useful polymers based on monomers such as thiophenes, pyrroles, vinylphenylenes, and phenylene oxides. Another interesting class of polymers is based on transition metal complexes whose ligands include heteroaromatic moieties containing pendant vinyl or acetyl groups. The presence of easily accessible, metal-based redox states along with the ligands' unsaturated substituent groups results in systems that are easily polymerized by electrochemical means.

In an effort to stabilize conjugated polymers towards photoredox processes, increase their solubility, and enhance their processability, a variety of substituents can be added to the polymer precursors. At the same time, these substituent groups have been shown to have a strong influence on the electronic, optical and mechanical properties of the polymer systems. The electrode arrays and diffusion gradients described herein can provide a powerful new methodology for the synthetic exploration of a larger variety of substituents than ever before possible.

An array of electrodes, for example as illustrated in FIG. 2, has electrodes with individually controlled potentials (V) and currents (j). The material precursors containing the substituent groups are contained in the input stream (feedstock). By combinatorially controlling both the feedstock and the V,j parameters at individual electrodes within the array, stoichiometric and conformational parameter space can be explored in a systematic manner. Variations in V,j across the array gives rise to the desired variations in degree of cross-linking, ligand coupling, etc.

Example 5

This example illustrates the use of a 4×4 spatially addressable array for the electrochemical preparation of a ternary Sn—Ru—Pt library having 16 different compositions.

Figure 13:
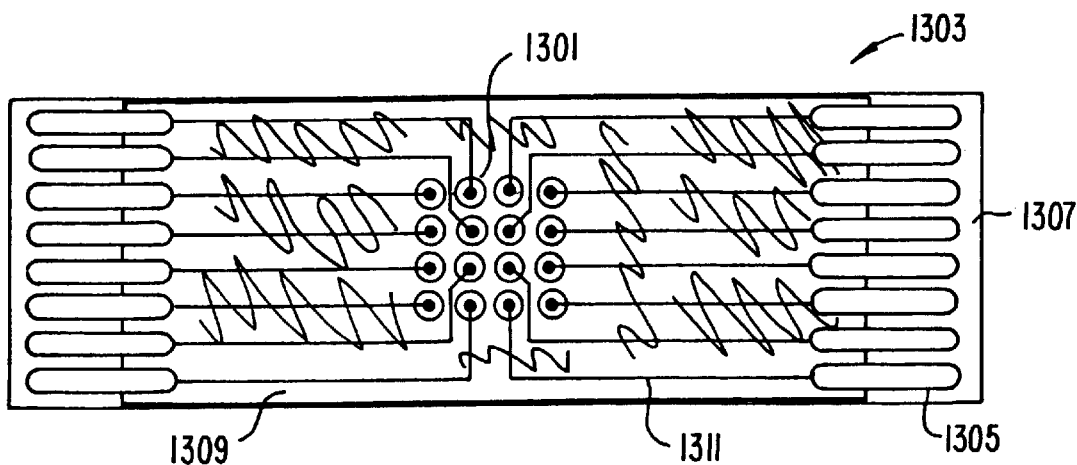
FIG. 13 illustrates the 4×4 spatially addressable array according to an alternate embodiment of the invention.

In this example, an array of 16 indium tin oxide (ITO) electrodes was fabricated on a glass substrate as illustrated in FIG. 13. Electrodes 1301 within array 1303 are accessible by pads 1305 on the edges of substrate 1307. An insulating layer 1309, which may for example be formed of photoresist, alumina, silica or some other easily deposited insulating layer, allows for the electrochemical deposition of metals from solution onto electrodes 1301, but not on connecting wires 1311.

In this example, three different combinatorial approaches to the fabrication of an electrochemically deposited array were explored on a single substrate, illustrating the versatility of the technique. By varying the composition of the electroplating solutions, applying varying potentials to the electrodes, and using metals that have differing reduction potentials, complicated ternary metal compositions can be achieved in a simple 4×4 array. Although not explored in this example, single element serial deposition steps, variations in the time and the amount of current passed, and increasing the number of metal ions to be deposited from solution (more than three) are obvious variants to develop more intricate libraries.

For this example, the ternary Sn—Ru—Pt library was prepared using solutions of 0.1M $H_2PtCl_6$, 0.1M $RuCl_3$ and 0.1M $SnCl_2$ in 0.5M $H_2SO_4$. In a deposition chamber similar to that described in example 1, the 4×4 ITO array, a silver/silver chloride (Ag/AgCl) reference electrode, and a platinum mesh counter electrode were set up. After the addition of the appropriate amount of a particular electroplating solution, a given electrode was addressed by connecting it to a potentiostat (not shown) and applying a predetermined series of voltage pulses using potential square wave voltammetry. In this example each of the electrodes was first subjected to a 1 second voltage pulse of 0 volts versus the reference electrode followed by a 1 second pulse at a predetermined potential between −0.3 volts and −1 volt before being returned to 0 volts. A total of 30 of these cycles were applied to each electrode.

Figure 14:
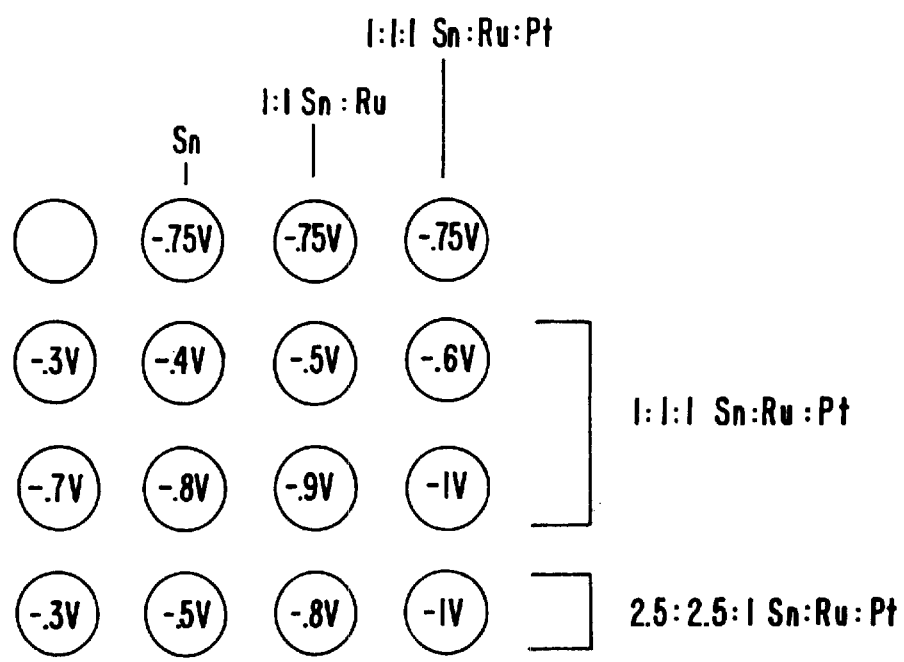
FIG. 14 illustrates the different solution compositions and potentials applied to the array shown in FIG. 13.

FIG. 14 illustrates the conditions under which the ternary Sn—Ru—Pt library described in this example was prepared. Electrode 1,1 (column, row) was intentionally left blank in order to later determine the indium and tin compositions of the underlying ITO electrodes. Row 1 was prepared at a constant potential of −0.75 volts while the solution content was varied from pure Sn (electrode 1,2) to 1:1 Sn: Ru (electrode 1,3) to 1:1:1 Sn:Ru:Pt (electrode 1,4). Rows 2 and 3 were prepared by keeping the solution composition constant (1:1:1 Sn:Ru:Pt) while varying the potential between −0.3 volts and −1 volts. Row 4 was prepared by varying the solution composition in favor of the less easily reduced metals (Sn and Ru) while sequentially varying the potential between −0.3 volts and −1 volt.

Although four different solutions are required to prepare the complete Sn—Ru—Pt library, removal and replacement of portions of the solutions starting with pure 0.1M $SnCl_2$ and ending up with a 2.5:2.5:1 Sn:Ru:Pt solution is easily accomplished in situ and eliminates the need for rinsing steps. Starting with the pure Sn solution, the electrochemical deposition of Sn metal is accomplished on electrode 1,2. Removing exactly half of this solution and replacing it with an equivalent amount of the 0.1M $RuCl_3$ solution gives a 1:1 Sn: Ru solution used for the deposition of a Sn/Ru composition on electrode 1,3. Removing exactly one third of this solution and replacing it with an equivalent amount of the 0.1M $H_2PtCl_6$ solution gives a 1:1:1 Sn:Ru:Pt solution used for the depositions of Sn/Ru/Pt compositions on electrodes 1,4 to 3,4. Removing exactly one half of this solution and replacing it with an equivalent amount of the 1:1 Sn:Ru solution gives a 2.5:2.5:1 Sn:Ru:Pt solution used for the deposition of Sn/Ru/Pt compositions on electrodes 4,1 to 4,4. According to this procedure, at no time does the array need to be removed from the bath in order to complete the ternary Sn—Ru—Pt library.

The results of the above-described depositions showing the percentages of Sn, Ru and Pt (corrected for the Sn content of the underlying ITO electrodes and normalized to 100%) plated out on each electrode are summarized in Table I.

TABLE I

| Electrode | % Sn | % Ru | % Pt | Electrode | % Sn | % Ru | % Pt |
|---|---|---|---|---|---|---|---|
| 1,1 | 0 | 0 | 0 | 3,1 | 8.3 | 14.4 | 77.3 |
| 1,2 | 100 | 0 | 0 | 3,2 | 8.5 | 9.7 | 81.8 |
| 1,3 | 77.3 | 22.7 | 0 | 3,3 | 13.5 | 13.1 | 73.4 |
| 1,4 | 23.1 | 13.5 | 63.4 | 3,4 | 10.8 | 13.8 | 75.4 |
| 2,1 | 12.3 | 24.2 | 63.5 | 4,1 | 17.3 | 28.3 | 54.4 |
| 2,2 | 17.7 | 16.1 | 66.2 | 4,2 | 20.6 | 28.2 | 51.2 |
| 2,3 | 17.9 | 14.9 | 67.2 | 4,3 | 22.2 | 28.6 | 49.2 |
| 2,4 | 14.9 | 13.3 | 71.8 | 4,4 | 22.8 | 26.2 | 51.0 |

From this table some obvious and expected trends are observed in the electrochemical deposition process. As expected, electrode 1,2 contains only Sn; electrode 1,3 contains a mixture of Sn and Ru; and electrode 1,4 contains a mixture of Sn, Ru and Pt. In general, since the Pt solution is easiest to reduce, more negative potentials tend to plate out more Pt. Comparison of the percent of Pt found in electrodes 2,1 through 3,2, for example, shows this trend nicely. This phenomenon can be counteracted by reducing the concentration of Pt in solution as was done in the case of electrodes 4,1 through 4,4. When compared to electrodes 1,4 through 3,4 which were prepared from the 1:1:1 Sn:Ru:Pt electroplating solution, the 1,4 to 4,4 electrodes show a dramatic decrease in the percentage of Pt in the final deposit corresponding to the decrease in the ratio of Pt in the 2.5:2.5:1 Sn:Ru:Pt electroplating solution. Similar trends to those described above exist for the Sn and Ru species in this example.

Array Screening Techniques

Once prepared, the array of resulting materials can be screened sequentially or in parallel for specific material characteristics. Either the entire array or a section thereof (e.g., a row of predefined regions) can be screened. Preferably the array is synthesized on a single substrate, thus maximizing the efficiency of the screening procedure. Furthermore, the individual electrodes of the array can be used to screen the materials contained at the predefined regions for specific electrochemical characteristics (e.g., ac impedance). Table II provides an overview of some of the properties that can be screened using the present invention.

At least some of the properties listed in Table II can be screened for using conventional methods and devices. Scanning systems which can be used to screen for the properties set forth in Table II include, but are not limited to, the following: scanning Raman spectroscopy; scanning NMR spectroscopy; scanning probe spectroscopy including, for example, surface potentialometry, tunnelling current, atomic force, acoustic microscopy, shearing-stress microscopy, ultra fast photo excitation, electrostatic force microscopy, tunneling induced photo emission microscopy, magnetic force microscopy, microwave field-induced surface harmonic generation microscopy, nonlinear alternating-current tunnelling microscopy, near-field scanning optical microscopy, and inelastic electron tunneling spectrometry; optical microscopy; scanning optical ellipsometry; scanning Eddy-current microscopy; and electron microscopy.

TABLE II

| | |
|---|---|
| Electrical | Superconductivity, critical current, critical magnetic field, conductivity, resistivity for resistive films, dielectric constant, dielectric strength, dielectric loss, stability under bias, polarization, permittivity, piezoelectricity, electromigration |
| Thermal | Coefficient of expansion, thermal conductivity, temperature variation, volatility and vapor pressure |
| Mechanical | Stress, anisotropy, adhesion, hardness, density, ductility, elasiticity, porosity |
| Morphology | Crystalline or amorphous, microstructure, surface topography, crystallite orientation |
| Optical | Refractive index, adsorption, birefringence, spectral characteristics, dispersion, frequency modulation, emission |
| Magnetic | Saturation flux density, magnetorestriction, coercive force, permeability |
| Chemical | Composition, complexation, acidity-basicity, catalysis, impurities, reactivity with substrate, corrosion and erosion resistance |

More particularly, to screen for conductivity and/or superconductivity, one of the following devices can be used: a scanning RF susceptibility probe, a scanning RF/microwave split-ring resonator detector, or a scanning superconductor quantum interference device (SQUID) detection system. To screen for hardness, a nano-indentor can, for example, be used. To screen for magnetoresistance, a scanning RF/microwave split-ring resonator detector or a SQUID detection system can be used. To screen for crystallinity, infrared or Raman spectroscopy can be used. To screen for magnetic strength and coercivity, a scanning RF susceptibility probe, a scanning RF/microwave split-ring resonator detector, a SQUID detection system or a Hall probe can be used. To screen for fluorescence, a photodetector or a charged-coupled device camera can be used. To screen for catalytic activity or lifetime, infrared techniques may be used that measure the endothermic or exothermic output of the array.

A more complete description of exemplary methods and apparatus for screening arrays of materials can be found in commonly assigned, co-pending U.S. Provisional Application, Serial No. 60/050,949, filed Jun. 13, 1997, the complete disclosure of which is incorporated herein by reference for all purposes.

As will be understood by those familiar with the art, the present invention may be embodied in other specific forms without departing from the spirit or essential characteristics thereof. Accordingly, disclosure of the preferred embodiment of the invention is intended to be illustrative, but not limiting, of the scope of the invention which is set forth in the following claims.

What is claimed is:

1. An apparatus for making an array of materials by electrochemical deposition and for screening members of the array of materials for an electrical property, the apparatus comprising:

a substrate having spatially addressable working electrodes corresponding to the members of the array of materials;

at least one other electrode, the at least one other electrode and the spatially addressable working electrodes adapted to apply an independently variable electrical potential between the spatially addressable working electrodes and the at least one other electrode so that when the substrate and the at least one other electrode contact a solution containing ions, ions in said solution undergo chemical reaction at the spatially addressable working electrodes forming the array of materials, wherein at least two members of the array of materials have different compositions;

a detector for measuring the electrical property of the members of the array of materials, with the spatially addressable working electrodes electrically connected to the detector; and reference electrodes having ends located adjacent ends of the spatially addressable electrodes;

wherein the spatially addressable working electrodes, the at least one other electrode and the reference electrodes are adapted to apply the independently variable electrical potential between each of the spatially addressable working electrodes and the at least one other electrode.

2. The apparatus of claim 1, wherein the spatially addressable working electrodes are embedded within the substrate.

3. The apparatus of claim 1, wherein ends of the spatially addressable working electrodes are disposed on a surface of the substrate.

4. The apparatus of claim 1, wherein the substrate is a resistive material that provides a substantially continuous electrical potential that varies between adjacent spatially addressable working electrodes.

5. The apparatus of claim 1, wherein the predefined regions are wells formed on a surface of the substrate.

6. The apparatus of claim 1, wherein the predefined regions are bumps formed on a surface of the substrate.

7. The apparatus of claim 1, wherein the ions undergo redox reaction at the spatially addressable working electrodes forming the array of materials.

8. An apparatus for making an array of different materials by electrochemical deposition, the array of materials having a plurality of members, the apparatus comprising:

a first chamber having an inlet for supplying a first ionic solution to the first chamber and an outlet for removing the first ionic solution from the first chamber;

a second chamber having an inlet for supplying a second ionic solution to the second chamber and an outlet for removing the second ionic solution from the second chamber;

a permeable membrane separating the first chamber from the second chamber, the permeable membrane allowing ions to migrate between the first chamber and the second chamber;

a substrate located in the first chamber, the substrate having predefined regions for receiving members of the array of materials;

an array of working electrodes having ends located adjacent each corresponding predefined region, the ends of the working electrodes discretely and electrically connected to the predefined regions and each of the working electrodes being fixed in the same predefined region throughout array formation;

reference electrodes having ends located adjacent the ends of the working electrodes; and a counter electrode located in the second chamber;

wherein the working electrodes, the reference electrodes and the counter electrode are adapted to apply an independently variable electrical condition between each of the predefined regions and the counter electrode so that ions undergo chemical reaction at the predefined regions of the substrate to form the array of materials in which at least more than nine members of the array of materials have different compositions.

9. The apparatus of claim 8, wherein the working electrodes are embedded within the substrate.

10. The apparatus of claim 8, wherein the ends of the working electrodes are disposed on a surface of the substrate.

11. The apparatus of claim 8, wherein the substrate is a resistive material adapted to provide a substantially continuous electrical potential between adjacent predefined regions.

12. The apparatus of claim 8, wherein the predefined regions are wells formed on a surface of the substrate.

13. The apparatus of claim 8, wherein the predefined regions are bumps formed on a surface of the substrate.

14. The apparatus of claim 5, wherein the ions undergo redox reaction at the predefined regions of the substrate to form the array of materials.

15. An apparatus for making and screening an array of materials by electrochemical deposition, the array of materials having a plurality of members, the apparatus comprising:

a substrate having predefined regions for receiving the members of the array of materials;

an array of spatially addressable working electrodes coupled with the substrate at the predefined regions;

at least one other electrode, the at least one other electrode and the spatially addressable working electrodes adapted to apply an independently controllable electrical condition between each of the predefined regions and the at least one other electrode so that when the substrate contacts a source material provided in a solution containing ions, ions in said solution undergo chemical reaction at the predefined regions forming the array of materials in which at least two members of the array of materials are different; and an apparatus for screening for a common selected property of the members of the array of materials while the members of the array of materials are on the substrate.

16. The apparatus of claim 15 wherein said apparatus for screening includes a scanning device.

17. The apparatus of claim 15 wherein said apparatus for screening is capable of screening for catalytic activity.

18. The apparatus of claim 15, wherein said apparatus for screening is capable of electrochemical screening.

19. An apparatus for housing an array of materials prepared by electrochemical deposition, the array of materials having a plurality of members, the apparatus comprising:

a substrate having a plurality of predefined regions defining an array including more than nine different uncharacterized electrochemically deposited inorganic materials;

an array of spatially addressable electrodes discretely coupled with the substrate at each of the predefined regions; and at least one other electrode, the at least one other electrode and the spatially addressable electrodes adapted to apply an independently controllable electrical condition between each of the predefined regions and the at least one other electrode so that when the substrate contacted a source material provided in a solution containing ions, ions in said solution undergo chemical reaction at the predefined regions forming the array of materials.

20. The apparatus of claim 19, further comprising an apparatus for screening members of the array for a common selected property.

21. The apparatus of claim 19 or 20, wherein said array includes more than nine uncharacterized catalyst candidates.

22. The apparatus of claim 21, wherein said array includes at least 9 uncharacterized catalyst candidates selected from ternary and higher order metal alloys.

23. The apparatus of claim 21, wherein said array includes at least 9 uncharacterized catalyst candidates selected from the system including Pt—Ru—Sn materials.

24. The apparatus of claim 19 or 20, wherein said array includes at least 9 uncharacterized phosphor candidates.

25. The apparatus of claim 21 further comprising another electrode and wherein said electrical condition is an electrical potential.

26. The apparatus of claim 21, wherein said array includes at least 9 uncharacterized platinum containing catalyst candidates.

\* \* \* \* \*

(12) EX PARTE REEXAMINATION CERTIFICATE (7042nd)
United States Patent
McFarland et al.

(10) Number: US 6,468,806 C1
(45) Certificate Issued: Sep. 1, 2009

(54) POTENTIAL MASKING SYSTEMS AND METHODS FOR COMBINATORIAL LIBRARY SYNTHESIS

(75) Inventors: Eric McFarland, San Jose, CA (US); Earl Danielson, Palo Alto, CA (US); Martin Devenney, Mountain View, CA (US); Christopher J. Warren, Mountain View, CA (US)

(73) Assignee: Symyx Technologies, Inc., Santa Clara, CA (US)

Reexamination Request:
No. 90/010,132, Apr. 1, 2008

Reexamination Certificate for:
Patent No.: 6,468,806
Issued: Oct. 22, 2002
Appl. No.: 08/941,170
Filed: Sep. 30, 1997

Related U.S. Application Data
(60) Provisional application No. 60/027,245, filed on Oct. 2, 1996.

(51) Int. Cl.
*G01N 33/543* (2006.01)
*G01N 27/00* (2006.01)
*C25D 21/12* (2006.01)

(52) U.S. Cl. .................. 436/518; 205/81; 205/118; 205/123; 205/136; 422/68.1; 422/82.01

(58) Field of Classification Search ............... None
See application file for complete search history.

(56) References Cited

U.S. PATENT DOCUMENTS

| | | | |
|---|---|---|---|
| 4,155,815 A | 5/1979 | Francis et al. |
| 4,871,435 A | 10/1989 | Denofrio |
| 5,055,263 A | 10/1991 | Meltzer |
| 5,066,372 A | 11/1991 | Weetall |
| 5,225,581 A | 7/1993 | Pintauro |
| 5,345,213 A | 9/1994 | Semancik et al. |
| 5,389,215 A | 2/1995 | Horiuchi et al. |
| 5,421,987 A | 6/1995 | Tzanavaras et al. |
| 5,427,674 A | 6/1995 | Langenskiold et al. |
| 5,441,619 A | 8/1995 | Kawachi et al. |
| 5,487,824 A | 1/1996 | Griego |
| 5,496,463 A | 3/1996 | Mori et al. |
| 5,580,253 A | 12/1996 | Abdalla |
| 5,656,139 A | 8/1997 | Carey et al. |
| 5,660,699 A | 8/1997 | Saito et al. |
| 5,672,256 A | 9/1997 | Yee |
| 5,985,356 A | 11/1999 | Schultz et al. |
| 6,187,164 B1 | 2/2001 | Warren et al. |

OTHER PUBLICATIONS

Chu et al., "Methanol Electro–oxidation on Unsupported Pt–Ru Alloys at Different Temperatures", Journal of The Electrochemical Society, 1996, vol. 143, No. 5, pp. 1685–1690.

Hurrell et al., "Redox Conduction in Electropolymerized Films of Transition–Metal Complexes of Os, Ru, Fe, and Co", Inorg. Chem., 1990, 29, pp. 736–741.

Richarz et al., "Surface and electrochemical characterization of electrodeposited PtRu alloys", Surface Science 335, 1995, pp. 361–371.

Landry "A simple saturate calomel reference electrode for polarography" Anal. Chim. Acta, 22:391–393, 1960.

Chidsey et al "Micrometer–spaced platinum interdifitated array electrode: fabrication, theory and initial use" Anal. Chem. 58:601–607, 1986.

*Primary Examiner*—Brenda Brumback

(57) ABSTRACT

Methods and apparatus are provided for the preparation of a substrate having an array of diverse materials, the materials being deposited at spatially addressable, predefined regions. In particular, potential masking systems are provided which generate spatially and temporally varying electric, magnetic and chemical potentials across a substrate. These varying potentials are used to deposit components of source materials onto a substrate in a combinatorial fashion, thus creating arrays of materials that differ slightly in chemical composition, concentration, stoichiometry, and/or thickness. The diverse materials may be organized in discrete arrays, or they may vary continuously over the surface of the substrate. The shape of the potential allows the determination of the composition of the resulting materials at all locations on the substrate.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 8–13 and 19–26 is confirmed.

Claims 1–7 and 14–18 are cancelled.

\* \* \* \* \*